UNITED STATES PATENT OFFICE.

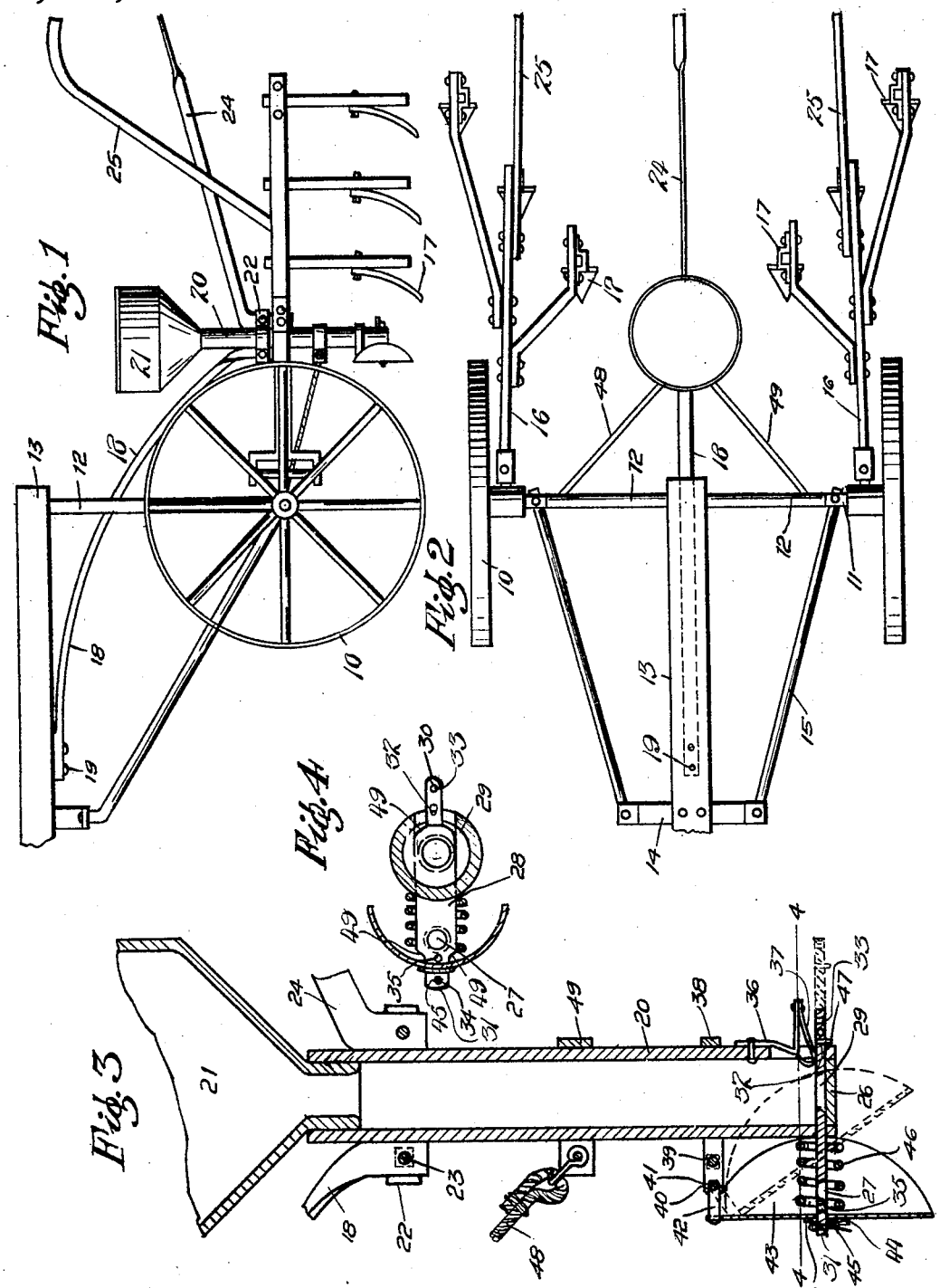

ANDREW J. REID, OF BUSSEY, IOWA.

REPLANTER.

1,324,618.   Specification of Letters Patent.   Patented Dec. 9, 1919.

Application filed March 25, 1919. Serial No. 285,010.

*To all whom it may concern:*

Be it known that I, ANDREW J. REID, a citizen of the United States, and resident of Bussey, in the county of Marion and State of Iowa, have invented a certain new and useful Replanter, of which the following is a specification.

The object of my invention is to provide a replanter of simple, durable and inexpensive construction.

More particularly it is my object to provide a device which may be attached to a wheel-mounted frame to replant hills of corn or other grain, in which the seeds originally planted have not resulted in plants.

A further object of my invention is to provide such a planter adapted to be attached to the frame of a cultivator or other earth working device, so that the re-planting may be done at the same time that the field is being cultivated.

Still a further object of my invention is to so arrange the planting mechanism that it may be normally held inoperative but may be readily and quickly moved to position to operate to plant a vacant hill.

Still a further object of my invention is to arrange the planting device so that it is normally yieldingly held away from the ground so that manually controlled means may be provided for moving the device to position to contact with the ground, and so that such contact may operate the planting mechanism to drop the seeds.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a cultivator having my improved re-planting device attached thereto.

Fig. 2 shows a plan view of the device shown in Fig. 1.

Fig. 3 shows a vertical, central, sectional view of the re-planting device; and

Fig. 4 shows a horizontal sectional view taken on the line 4—4 of Fig. 3.

Referring to the accompanying drawings, I have used the reference numeral 10 to indicate generally the wheels which are rotatably mounted on the axle 11 of a horse-drawn cultivator, the axle being formed with an upwardly projecting arch or yoke 12 designed to be secured to the tongue 13. Braces 15 are extended upwardly and forwardly from the axles 11 adjacent to the wheels, to a cross brace 14 which is secured to the tongue. Secured to the axles 11 are rearwardly extending bars 16 to which are secured cultivating or earth working devices 17. These parts are of common knowledge and form no part of this invention.

A flat spring 18 of considerable length has its forward end secured to the under side of the tongue 13, as by screws 19, and is curved preferably downwardly and rearwardly to position between and slightly in front of the forward cultivating shovels 17.

The re-planting device consists of a hollow cylindrical member 20 having at its upper end a hopper or seed receiving device 21 and provided adjacent to its upper end with clip members 22 which are designed to receive the rear end of the spring 18. The spring is held in place by any suitable means, as by means of bolts 23.

The clip members 22 also similarly support a rearwardly extending handle member 24 which extends to position adjacent to the cultivator handles 25 so that the operator may readily grasp it when desired.

The lower end of the tubular member 20 is closed by means of a disk 26 which may be detachably mounted in the bottom of the tubular member. Above the closure member 26 the tubular member is provided with opposite registering openings designed to slidably receive a reciprocating bar 28 which is provided with openings 27 and 29 adjacent to its ends. The slide bar 28 has lugs 30 and 31 extending from either end, which have spaced openings 32, 33, 34 and 35 therein. The right-hand slot in the tubular member 20, as shown in Fig. 3, is elongated vertically to receive a bracket 36, which supports a spring 37.

From the construction of the parts just described, it will be seen that when the slide bar 28 is reciprocated within the openings in the tubular member 20 the opening 29 will reciprocate into and out of the tubular member so that the seeds which drop into this opening when the opening is within the tubular member, may drop out onto the ground when the opening is moved to position outside the tubular member. The spring 37 acts as a yielding comb or stop member to prevent damage to the seeds which are being moved out of the tubular member to be dropped onto the ground.

The following means are provided for reciprocating the slide bar 28: Somewhat above the bracket 36 on the tubular member 20 a substantially U-shaped clip 38 is secured, as by means of the bolt 39. Ears 40 extend forwardly from the clip 38 and carry a bolt 41 upon which is pivoted a link 42. The link 42 is fixed to the top of a shovel or shoe member 43.

The shovel or shoe member 43 comprises a substantially oval shaped piece of sheet metal which is rolled on its longitudinal axis to form a substantially semi-circular cross-sectional outline. Near the center of the shoe 43 an opening is provided designed to somewhat loosely receive the extending lug 31 at the end of the slide bar 28. A washer 44 and a pin 45 which extends through the opening 34, prevent the shoe 43 from sliding off the end of the extension 31, while the shoulders 49 at the inner end of the extension prevent the shoe from sliding along the sliding bar 28.

A spring 46 is interposed between the shoe 43 and the tubular member 20 to normally yieldingly hold the sliding bar 28 and the shoe 43 at the left-hand limit of their movement. A pin 47 extended through the opening 32 and adapted to coact with the surface of the tubular member 20 limits such movement toward the left end, in Fig. 3. Movement of the shoe 43 toward the right, as shown in Fig. 3, is limited by its contact with the tubular member 20 or by compression on the spring 46.

It will be noted that the openings 27 and 29 are somewhat wider at the bottom of the slide bar than at the top, so that seeds which fall into these openings from the tubular member 20 will be sure to readily fall out from the openings when the slide bar is moved to position the opening for discharging the seed.

Referring to Fig. 4, it will be noted that the openings 32, 33, 34 and 35, together with the seed receiving openings 27 and 29, are so arranged that the slide bar 28 may be turned around and used selectively so that either opening 27 or 29 may discharge the seeds. By this construction the same slide bar may be used for planting selectively different numbers of seeds in the hills, by a simple readjustment of the mechanism.

In order to insure a substantially vertical downward movement of the re-planting device when the handle 24 is moved downwardly, I provide flexible devices 48 which extend from a collar 49 on the tubular member 20 to the lower ends of the yoke member 12.

In the practical operation of my improved device the parts are installed as shown in the drawings and heretofore described. When the cultivator is moved forwardly over the ground the operation of the cultivator is normally such that the shovels 17 are disposed on either side of the row of grain which is being cultivated, while my improved re-planter stands in position directly above the row. As the frame proceeds forwardly along the ground the operator glances ahead to see if any of the hills in which grain has been planted, have failed to grow plants, and when he reaches the position where the re-planting device is substantially above the empty hill he presses down on the lever 24. The downward movement of the lever also carries the re-planting device downwardly with it, and contact of the shoe 43 with the ground causes the shovel 43 to move rearwardly, as shown in dotted lines in Fig. 3. Movement of the shoe 43 rearwardly also causes such grain as may have lodged in the opening 29 to be moved rearwardly to position outside of the tubular member 20, thereby permitting the grain which was in this opening to fall onto the ground in the groove or trench made by the shoe 43. On account of the forward movement of the machine and the position of the shoe 43, the earth at the sides of the trench or trough made by the shoe will then roll down over the seeds and automatically cover them.

In cases where the nature of the ground is such that the seeds are not thus covered, the action of the cultivator shovels 17 will insure that the ground will be moved over the seeds to cover them.

As soon as the pressure on the handle 24 is released, the spring 18 moves the re-planting device to position where the shoe does not engage the ground, and releasing the pressure against the shoe 43 which is caused by the forward motion of the machine over the ground, permits the spring 46 to move the slide bar 28 forwardly, thereby again bringing the opening 29 to position where seeds in the tubular member 20 may enter the opening.

In many parts of the country it has been the custom to plow up a field and re-plant it if less than two-thirds of the hills contained healthy plants; while, if the proportion of healthy plants were substantially greater than two-thirds, the vacant hills in the field would be left vacant.

With my improved device, however, it is possible to replant every vacant hill in the field with but a very slight addition to the time for cultivating the field and to the effort required by the operator of the cultivator. It will be obvious, therefore, that this is the important advantage of my device.

A further advantage resides in the construction of the device whereby it is normally held in position so that it does not contact with the plants which are being cultivated, but may be moved to operative position and a hill planted with comparatively slight effort on the part of the operator.

Some changes may be made in the details of the construction and arrangement of the parts of my device without departing from the essential features and purposes of my invention, and it is my intention to cover by my claims any modified forms of structure or use of mechanical equivalents which may be reasonably included within their scope.

I claim as my invention:

1. In a replanter adapted to be secured to a cultivator, comprising an arched axle; wheels at either end of the axle; cultivating devices secured to the axle adjacent to the wheels and extended rearwardly; and a tongue secured to and extended forwardly from the axle; a leaf spring having one end secured to the tongue, and the balance of the spring extended rearwardly beneath the axle; a replanting device secured to the rear end of the spring adapted when brought into contact with the ground to automatically form a furrow and drop a predetermined number of seeds therein; and a handle secured to and extended rearwardly from the replanting device, the parts being so arranged that said device is normally, yieldingly held in position spaced a predetermined distance from the ground.

2. In a replanter adapted to be secured to a cultivator comprising an arched axle; wheels at either end of the axle; cultivating devices secured to the axle adjacent to the wheels and extended rearwardly; and a tongue secured to and extended forwardly from the axle; a leaf spring having one end secured to the tongue, and the balance of the spring extended rearwardly beneath the axle; a replanting device secured to the rear end of the spring adapted when brought into contact with the ground to automatically form a furrow and drop a predetermined number of seeds therein; a pair of flexible devices having one end secured to the replanting device, and the other end secured to the axle adjacent to one of the wheels; and a handle secured to and extended rearwardly from the replanting device, the parts being so arranged that said device is normally yieldingly held in position spaced a predetermined distance from the ground.

Des Moines, Iowa, March 10, 1919.

ANDREW J. REID.